(12) United States Patent
Matsumoto et al.

(10) Patent No.: US 7,870,323 B2
(45) Date of Patent: Jan. 11, 2011

(54) BRIDGE CIRCUIT FOR INTERFACING PROCESSOR TO MAIN MEMORY AND PERIPHERALS

(75) Inventors: Munehisa Matsumoto, Hiratsuka (JP); Shinichiro Kuno, Hiratsuka (JP)

(73) Assignee: Marvell World Trade Ltd., St. Michael (BB)

( * ) Notice: Subject to any disclaimer, the term of this patent is extended or adjusted under 35 U.S.C. 154(b) by 112 days.

(21) Appl. No.: 12/333,854

(22) Filed: Dec. 12, 2008

(65) Prior Publication Data

US 2009/0172238 A1 Jul. 2, 2009

Related U.S. Application Data

(60) Provisional application No. 61/016,670, filed on Dec. 26, 2007.

(51) Int. Cl.
G06F 13/36 (2006.01)
(52) U.S. Cl. .................................................... 710/308
(58) Field of Classification Search ......... 710/305–315; 711/111
See application file for complete search history.

(56) References Cited

U.S. PATENT DOCUMENTS

| | | | |
|---|---|---|---|
| 5,822,550 A | | 10/1998 | Milhaupt et al. |
| 5,857,117 A | * | 1/1999 | Abramson et al. ............. 710/65 |
| 6,101,566 A | * | 8/2000 | Woods et al. ................ 710/315 |
| 6,145,029 A | * | 11/2000 | Deschepper et al. .......... 710/36 |
| 6,148,357 A | * | 11/2000 | Gulick et al. ............... 710/309 |
| 6,542,953 B2 | * | 4/2003 | Porterfield ................... 710/305 |
| 6,587,868 B2 | * | 7/2003 | Porterfield ................... 709/203 |
| 2003/0191730 A1 | * | 10/2003 | Adkins et al. ................. 706/47 |
| 2005/0177829 A1 | * | 8/2005 | Vishwanath ................ 717/177 |

OTHER PUBLICATIONS

"Intel 440BX Agpset: 82443BX Host Bridge/Controller"; Intel Corp.; Apr. 1, 1998; 132 pages.
"82371AB PCI-To-ISA / IDE Xcelerator (PIIX4)"; Intel Corp.; Apr. 1, 1997; 284 pages.
"PCI Local Bus Specification"; PCI Local Bus; Jun. 1, 1995; 298 pages.
"nForce 500: nforce4 on Steroids?"; Gary Key & Wesley Fink; May 24, 2006; 32 pages.
"SiS 635 for the Intel Pentium III"; Frank Volkel; Jun. 11, 2001; 4 pages.
International Search Report and the Written Opinion of the International Searching Authority, or the Declaration mailed Jul. 4, 2009 for International Appllication No. PCT/IB2008/003613 filed Dec. 23, 2008; 14 pages.

* cited by examiner

*Primary Examiner*—Paul R Myers

(57) ABSTRACT

A bridge circuit includes a bus, a memory interface module, a memory control module, and an external storage control module. The memory interface module receives a memory address from a processor via a memory interface and outputs the memory address to the bus. The memory address corresponds to one of a plurality of address regions of an address space of the processor. The memory control module receives the memory address via the bus and communicates with a memory when the memory address corresponds to a first one of the plurality of address regions. The external storage control module receives the memory address via the bus and communicates with an external storage device when the memory address corresponds to a second one of the plurality of address regions.

14 Claims, 7 Drawing Sheets

Task File Register

| Address | Read | Write |
|---|---|---|
| +0h | Reserved | |
| +1h | Features (exp) | ↓ |
| +2h | Sector Count (exp) | ↓ |
| +3h | LBA Low (exp) | ↓ |
| +4h | LBA Mid (exp) | ↓ |
| +5h | LBA High (exp) | ↓ |
| +6h | Control | ↓ |
| +7h | Reserved | ↓ |
| +8h | Reserved | ↓ |
| +9h | Error | Features |
| +Ah | Sector Count | ↓ |
| +Bh | LBA Low | ↓ |
| +Ch | LBA Mid | ↓ |
| +Dh | LBA High | ↓ |
| +Eh | Device/Head | |
| +Fh | Status | Command |

FIG. 5

I/O Control Register

| Address | Register Name | Functionality |
|---|---|---|
| +10h | Command Register | Read/Write, Start/Stop |
| +11h | Status Register | Error, Current Descriptor |
| +12h-15h | Pointer Register | Description Pointer Address |
| +16h | Control Register | Clock Frequency, Data Transfer Mode |

FIG. 6

Description Table

| Address | Register |
|---|---|
| Pointer +0-3 | First Description Address [31:0] |
| Pointer +4-7 | EOT[31], First Transfer Bytes [21:0] |
| Pointer +8-11 | Second Description Address [31:0] |
| Pointer +12-15 | EOT[31], Second Transfer Bytes [21:0] |
| Pointer +8n-8 – 8n-5 | n-th Description Address [31:0] |
| Pointer +8n-4 – 8n-1 | EOT[31], n-th Transfer Bytes [21:0] |

FIG. 7

USB Control Register

| Address | Register | Write |
|---|---|---|
| +18h-19h | VID | Vendor ID |
| +1Ah-1Bh | DID | Device ID |
| +1Ch-1Dh | CMD | Command Register |
| +1Eh-1Fh | STA | Device Status |
| +20h | RID | Revision ID |
| +21h | PI | Programming Interface |
| +22h | SCC | Sub Class Code |
| +22h | BCC | Base Class Code |
| +23h | HTYPE | Header Type |
| +24h-27h | Base | Base Address Register |
| +28h-29h | SVID | Subsystem Vendor ID |
| +2Ah-2Bh | SID | Subsystem ID |
| +2Ch | INTR_LN | Interrupt Line |
| +2Dh | INTR_PN | Interrupt Pin |
| +30h | SB_RELNUM | Serial Bus Release |
| +32h-33h | SUB_LEGKEY | Legacy Keyboard/Mouse |
| +34h | USB_RES | USB Resume Enable |

FIG. 8

BRIDGE CIRCUIT FOR INTERFACING PROCESSOR TO MAIN MEMORY AND PERIPHERALS

CROSS-REFERENCE TO RELATED APPLICATIONS

This application claims the benefit of U.S. Provisional Application No. 61/016,670, filed on Dec. 26, 2007. The disclosure of the above application is incorporated herein by reference in its entirety.

FIELD

The present disclosure relates to a bridge circuit that interfaces a processor to a plurality of external devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A consumer electronics (CE) device, such as a portable video camera, may comprise an application specific integrated circuit (ASIC) and a hard disk drive (HDD). The ASIC may comprise a processor and a HDD controller (HDC). The processor communicates with the HDD via the HDC. The HDC communicates with the HDD through a storage interface that complies with the storage interface of the HDD. For example, the storage interface may include an advanced technology attachment (ATA) interface, a serial ATA (SATA) interface, etc.

To utilize HDDs having different storage interfaces, the HDCs of the CE devices may need to be designed to comply with the different storage interfaces. Designing the HDCs to comply with the different storage interfaces increases the time and cost of CE device development.

SUMMARY

A bridge circuit comprises a bus, a memory interface module, a memory control module, and an external storage control module. The memory interface module receives a memory address from a processor via a memory interface and outputs the memory address to the bus. The memory address corresponds to one of a plurality of address regions of an address space of the processor. The memory control module receives the memory address via the bus and communicates with a memory when the memory address corresponds to a first one of the plurality of address regions. The external storage control module receives the memory address via the bus and communicates with an external storage device when the memory address corresponds to a second one of the plurality of address regions.

The bridge circuit further comprises a peripheral device control module that receives the memory address via the bus and that communicates with a peripheral device when the memory address corresponds to a third one of the plurality of address regions. The bridge circuit further comprises an external storage interface that interfaces the external storage control module to the external storage device. The bridge circuit further comprises a peripheral device interface that interfaces the peripheral device control module to the peripheral device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 5 illustrates exemplary information included in a task file register according to the present disclosure;

FIG. 6 illustrates exemplary information included in an I/O control register according to the present disclosure;

FIG. 7 illustrates exemplary information included in a description table according to the present disclosure; and FIG. 8 illustrates exemplary information included in a universal serial bus (USB) control register according to the present disclosure.

DESCRIPTION

Figure 1:
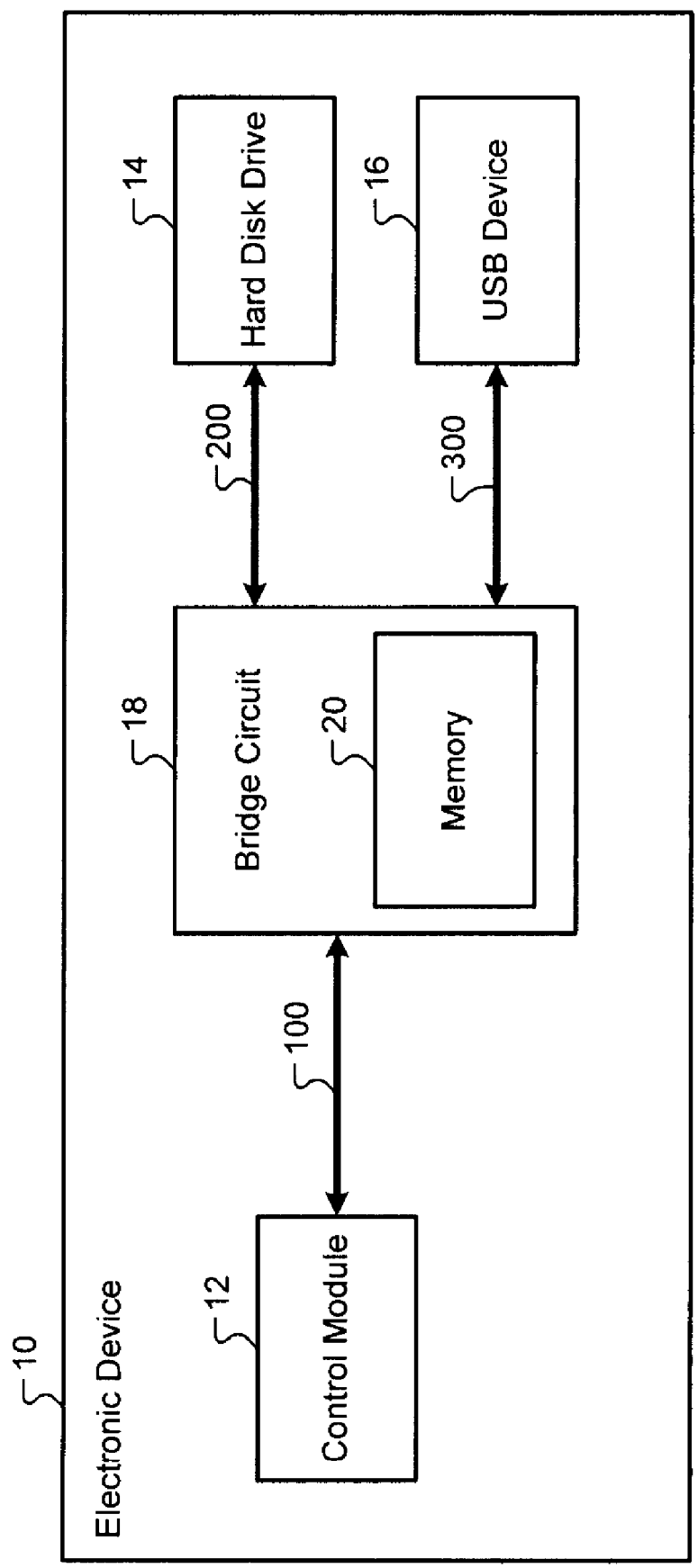
FIG. 1 is a functional block diagram of an electronic device according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

A consumer electronics (CE) device typically includes a processor that communicates with memory and an external device. The processor typically accesses memory and the external device through separate interfaces. The processor accesses memory through a memory bus. The processor accesses the external device through an external device interface.

A bridge circuit according to the present disclosure allows the processor to access memory and one or more external devices via the memory bus. More specifically, when the processor generates a request to read or write data, the bridge circuit may receive a memory address for the data from the processor via the memory bus. The bridge circuit may communicate with either the external device or memory based on the memory address. For example, the bridge circuit may communicate with memory when the memory address corresponds to a first region of a memory address space of the processor. The bridge circuit may communicate with the external device when the memory address is from a second region of the memory address space.

Referring now to FIG. 1, an exemplary electronic device 10 comprises a control module 12, a hard disk drive (HDD) 14, a universal serial bus (USB) device 16, and a bridge circuit 18. For example only, the electronic device 10 may include a portable video camera. The control module 12 controls the electronic device 10. In some implementations, the HDD 14 may be replaced by any suitable external storage device. For example, the HDD 14 may be replaced by an optical disc drive. The USB device 16 may include non-volatile semiconductor memory (e.g., flash memory). The USB device 16 may also include an input/output device such as a keyboard and/or a printer. The USB device 16 may be detachable from the electronic device 10.

The control module 12 communicates with the HDD 14 via a memory bus 100, the bridge circuit 18, and an external storage interface 200. The external storage interface 200 is compatible with a storage interface of the HDD 14. For example, the external storage interface 200 and the storage interface of the HDD 14 may include one of an advanced technology attachment (ATA) interface, a serial ATA (SATA) interface, etc. The control module 12 communicates with the USB device 16 via the memory bus 100, the bridge circuit 18, and a USB interface 300.

The control module 12 communicates with the bridge circuit 18 via the memory bus 100. The bridge circuit 18 may comprise an integrated circuit (IC) designed to interface the control module 12 with external storage and peripheral devices having different interfaces. For example, the bridge circuit 18 may be designed to interface the control module 12 with memory having a memory interface, an external storage device having a storage interface, and a USB device having a USB interface. The bridge circuit 18 and the control module 12 may be implemented on the same IC or on different ICs.

The bridge circuit 18 includes memory 20. The control module 12 may store data in memory 20. Memory 20 may include a random access memory. For example, memory 20 may include a dynamic random access memory (DRAM).

Depending on the processor utilized by the control module 12, the control module 12 may read/write data over an address space. For example only, the address space may include three separate address regions: Memory 20 may be assigned a first address region; the HDD 14 may be assigned a second address region; and the USB device 16 may be assigned a third address region within the address space.

The HDD 14 and the USB device 16 may receive data from memory 20 or the control module 12. The HDD 14 and the USB device 16 may receive data from memory 20 via a direct memory access (DMA) or a programmed input/output (PIO) transfer. The HDD 14 and the USB device 16 may transmit data to memory 20 or the control module 12. The HDD 14 and the USB device 16 may transmit data to memory 20 via DMA or PIO transfer.

The control module 12 communicates with the bridge circuit 18 via the memory bus 100. The memory bus 100 may include a DRAM interface. Accordingly, the memory bus 100 may include, but is not limited to, interfaces for synchronous DRAM (SDRAM), double data rate DRAM (DDR), DDR2, DDR3, and Rambus® DRAM (RDRAM).

The bridge circuit 18 communicates with the HDD 14 via the external storage interface 200. The external storage interface 200 may comply with various interface standards. For example only, the external storage interface 200 may comply with an advanced technology attachment (ATA) interface, a serial ATA (SATA) interface, and an advanced technology attachment packet interface (ATAPI). The external storage interface 200 may also comply with a consumer electronics ATA (CE-ATA) interface, personal computer memory card international association (PCMCIA) interface, and a small computer systems interface (SCSI).

The bridge circuit 18 and the USB device 16 communicate via the USB interface 300. The USB interface 300 may include, but is not limited to, USB 1.1 and USB 2.0 interfaces.

Figure 2:
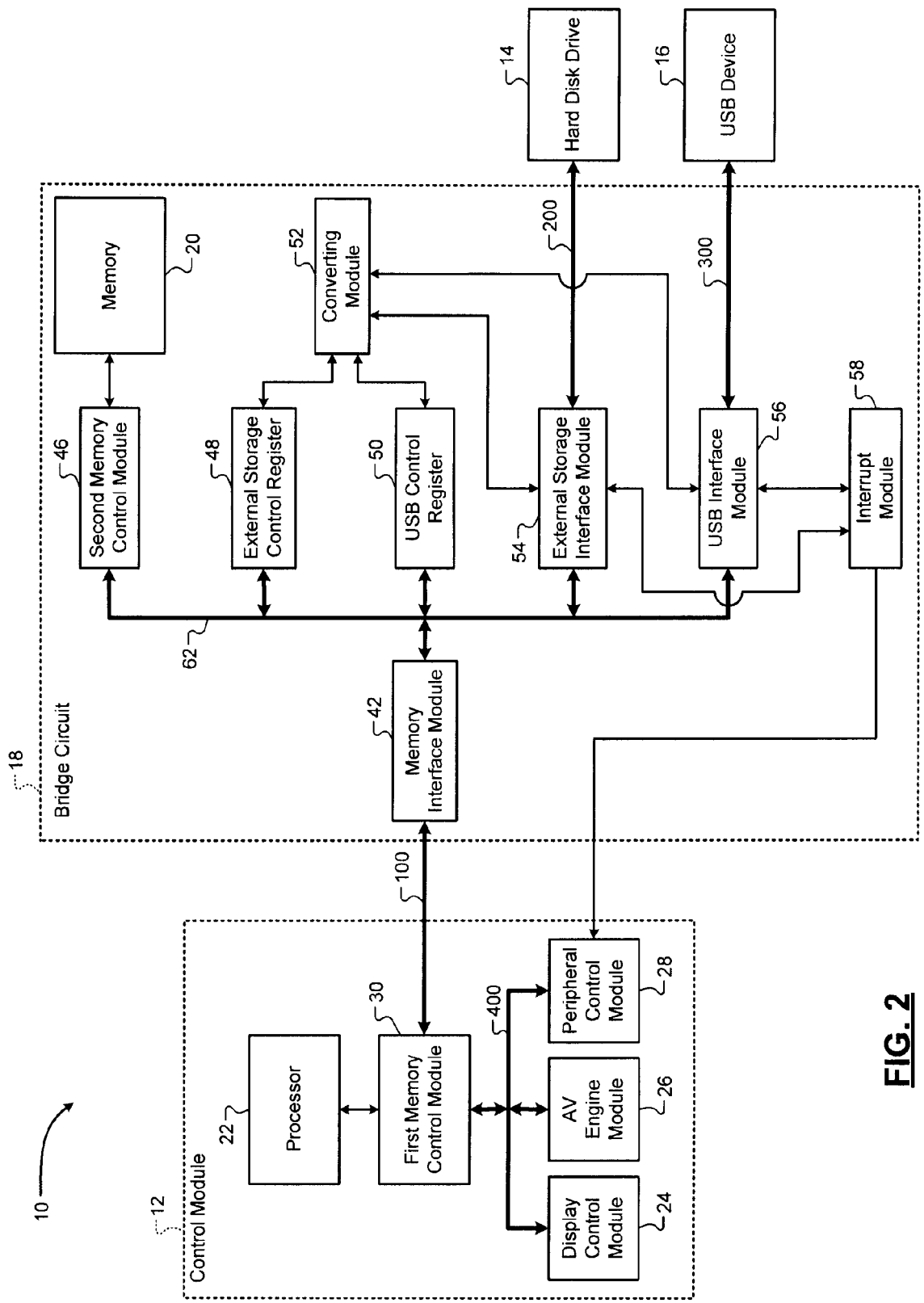
FIG. 2 is a functional block diagram of a control module and a bridge circuit according to the present disclosure.

Referring now to FIG. 2, the control module 12 may comprise a processor 22, a display control module 24, an audio-video (AV) engine module 26, a peripheral control module 28, and a first memory control module 30. The processor 22 executes one or more programs to operate the electronic device 10. The processor 22 may transfer data to other components of the electronic device 10 (e.g., memory 20). The processor 22 may also transfer commands to other components of the electronic device 10. For example, the processor 22 may transfer a read/write command to the HDD 14, the USB device 16, and memory 20. Hereinafter, the terms "data" and "command" are used interchangeably.

The display control module 24 controls a display (not shown) that may be included in the electronic device 10. The AV engine module 26 may process audio and video data acquired by the electronic device 10. The peripheral control module 28 may communicate with a variety of peripheral devices provided in the electronic device 10. For example, the HDD 14 may interrupt the processor 22 via the peripheral control module 28. The display control module 24, the AV engine module 26, and the peripheral control module 28 are connected to an Input/Output (I/O) interface 400. The I/O interface 400 may include a peripheral component interconnect (PCI) bus.

The processor 22 communicates with the display control module 24, the AV engine module 26, and the peripheral control module 28 via the first memory control module 30 and the I/O interface 400. The processor 22 transfers data to the I/O interface 400 via the first memory control module 30. The processor 22 receives data from the I/O interface 400 via the first memory control module 30. The first memory control module 30 transfers data to the display control module 24, the AV engine module 26, and the peripheral control module 28 via the I/O interface 400. The display control module 24, the AV engine module 26, and the peripheral control module 28 transfer data to the first memory control module 30 via the I/O interface 400.

The processor 22 may communicate with memory 20, the HDD 14, and the USB device 16 via the first memory control module 30 and the memory bus 100. The processor 22 transfers data to the memory bus 100 via the first memory control module 30. The first memory control module 30 transfers data from the processor 22 to the memory bus 100 when the processor 22 accesses the first, the second, or the third address regions of the address space.

The first memory control module 30 transfers data from the memory bus 100 to the processor 22. The first memory control module 30 may receive data from memory 20, the HDD 14, or the USB device 16 when the processor 22 accesses the first, the second, or the third address regions, respectively.

The processor 22 accesses an address in the first address region to write/read data to/from memory 20. In other words, the processor 22 accesses an address in the first address region when the processor 22 issues a write/read command to/from memory 20. The first memory control module 30 transfers the address to the memory bus 100.

The processor 22 accesses the second address region to write/read data to/from the HDD 14. The second address region is separate from the first address region. The processor 22 may transfer commands to an address in the second address region to control the HDD 14. For example, the processor 22 may issue a command to the HDD 14 to write/ read data to/from a position on the HDD 14. The position may include a start address and a number of sectors. In addition, the processor 22 may read status of the HDD 14 by reading an address in the second address region.

The processor 22 accesses the third address region to transmit/receive data to/from the USB device 16. The third address region is separate from the first address region and the second address region. The processor 22 may transfer commands to an address in the third address region to control the USB device 16. For example, the processor 22 may write/read data to/from the USB device 16. The processor 22 may also receive data from the USB device 16 through an address in the third address region. For example, the processor 22 may receive status of the USB device 16 by reading an address in the third address region.

The bridge circuit 18 comprises a memory interface module 42 and an internal bus 62. The memory interface module 42 interfaces with the control module 12 via the memory bus 100. The memory interface module 42 receives data from the memory bus 100. The memory interface module 42 transfers data from the memory bus 100 to the internal bus 62. The memory interface module 42 may also transfer data from the internal bus 62 to the memory bus 100. Data received from the internal bus 62 may include data received from memory 20, the HDD 14, and the USB device 16.

The bridge circuit 18 further comprises a second memory control module 46 that communicates with the internal bus 62. The second memory control module 46 may transfer data from the internal bus 62 to memory 20. The second memory control module 46 may also transfer data from memory 20 to the internal bus 62. Memory 20 is assigned the first address region within the memory address space of the control module 12. Accordingly, the second memory control module 46 may transfer data from the internal bus 62 to memory 20 when the processor 22 accesses the first address region. Memory 20 may store data received from the second memory control module 46. The second memory control module 46 may also transfer data from memory 20 to the internal bus 62 when the processor 22 accesses the first address region.

The bridge circuit 18 further comprises an external storage control register 48 that communicates with the internal bus 62. The external storage control register 48 is assigned the second address region within the memory address space of the control module 12. Accordingly, the external storage control register 48 may receive data from the internal bus 62 when the processor 22 accesses the second address region. The external storage control register 48 may store data received from the internal bus 62.

The bridge circuit 18 further comprises a converting module 52. The external storage control register 48 may output data received from the internal bus 62 to the converting module 52. The converting module 52 converts the data into a command that may be compatible with the HDD 14. For example, the command may be compatible with a command of ATA, S-ATA, CE-ATA, PCMCIA, SCSI, and/or ATAPI.

The bridge circuit 18 further comprises an external storage interface module 54 that communicates with the HDD 14 via the external storage interface 200. The converting module 52 outputs the command to the external storage interface module 54. The external storage interface module 54 transfers the command to the HDD 14 via the external storage interface 200.

Additionally, the external storage interface module 54 may receive data from the HDD 14 via the external storage interface 200. For example, the external storage interface module 54 may receive the status of the HDD 14. The external storage interface module 54 may transfer the received data to the converting module 52. The converting module 52 converts the received data into data that is readable by the processor 22 when the processor 22 accesses the second address region. The converting module 52 outputs the data to the external storage control register 48.

The external storage interface module 54 may receive data from memory 20 or the control module 12 via the internal bus 62. The external storage interface module 54 may write data to the HDD 14 via the external storage interface 200. The external storage interface module 54 may read data from the HDD 14 via the external storage interface 200. The external storage interface module 54 may transfer data read from the HDD 14 to memory 20 or the control module 12 via the internal bus 62. The external storage interface module 54 may transfer the data to memory 20 via a DMA transfer. The bridge circuit 18 further comprises an interrupt module 58 that may interrupt the processor 22 when the DMA transfer is complete. The interrupt module 58 may interrupt the processor 22 via the peripheral control module 28 and the I/O interface 400.

The bridge circuit 18 further comprises a USB control register 50 that communicates with the internal bus 62. The USB control register 50 is assigned the third address region within the memory address space of the control module 12. Accordingly, the USB control register 50 receives data from the internal bus 62 when the processor 22 accesses the third address region. The USB control register 50 may store data received from the internal bus 62. The USB control register 50 may also output data received from the internal bus 62 to the converting module 52.

The converting module 52 receives the data from the USB control register 50. The converting module 52 converts the data into a USB command that may be compatible with the USB device 16. For example, the USB command may be compatible with USB 1.1, and/or USB 2.0. The bridge circuit 18 further comprises a USB interface module 56 that communicates with the USB device 16 via the USB interface 300. The converting module 52 outputs the USB command to the USB interface module 56. The USB interface module 56 transfers the USB command to the USB device 16 via the USB interface 300.

The USB interface module 56 may receive data from the USB device 16 via the USB interface 300. For example, the USB interface module 56 may receive the status of the USB device 16. The USB interface module 56 may transfer the received data to the converting module 52. The converting module 52 converts the received data into data that is readable by the processor 22 when the processor 22 accesses the third address region. The converting module 52 outputs the data to the USB control register 50.

The USB interface module 56 may receive data from memory 20 or the control module 12 via the internal bus 62. The USB interface module 56 may transfer data to the USB device 16 via the USB interface 300. The USB interface module 56 may receive data from the USB device 16 via the USB interface 300. The USB interface module 56 may transfer the data read from the USB device 16 to memory 20 or the control module 12 via the internal bus 62. The USB interface module 56 may transfer data to memory 20 via a DMA transfer. The interrupt module 58 may interrupt the processor 22 when the DMA transfer is complete. The interrupt module 58 may interrupt the processor 22 via the peripheral control module 28 and the I/O interface 400.

Figure 3:
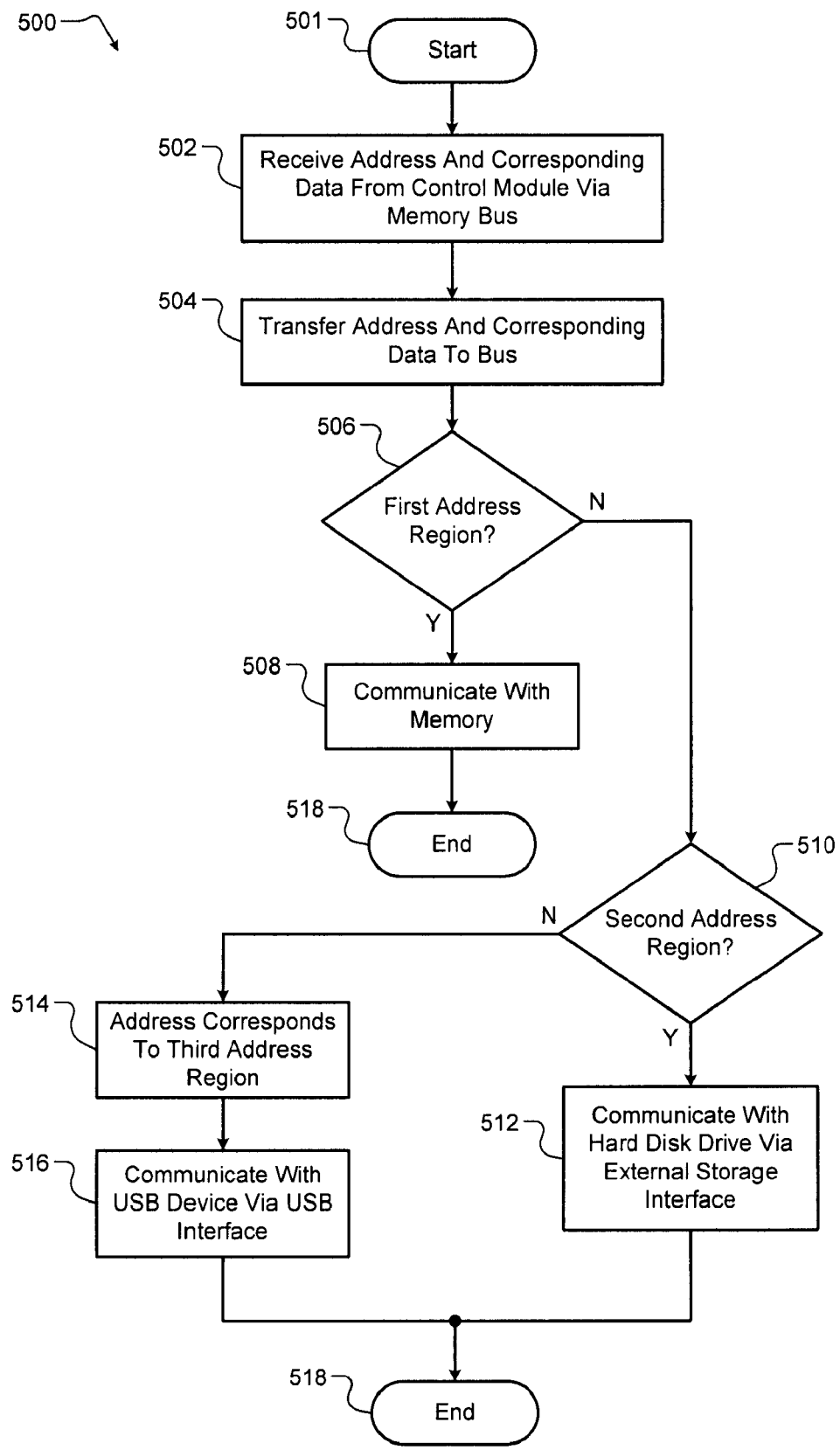
FIG. 3 is a flowchart of a method for communicating with external devices via a memory bus.

Referring now to FIG. 3, an exemplary method 500 for communicating with external devices via a memory bus is shown. The method 500 starts in step 501. In step 502, the memory interface module 42 receives an address and corresponding data from the control module 12 via the memory bus 100.

In step 504, the memory interface module 42 transfers the address and data to the internal bus 62. In step 506, the second memory control module 46 determines whether the address corresponds to the first address region. If true, the second memory control module 46 communicates with (e.g., writes/reads data to/from) memory 20 in step 508. If false, the method 500 continues with step 510.

In step 510, the external storage control register 48 determines whether the address corresponds to the second address region. If true, the bridge circuit 18 communicates with the HDD 14 via the external storage interface 200 in step 512. If false, the method 500 continues with step 514.

In step 514, the USB control register 50 determines that the address corresponds to the third address region. In step 516, the bridge circuit 18 communicates with the USB device 16 via the USB interface 300. The method 500 ends in step 518.

Figure 4:
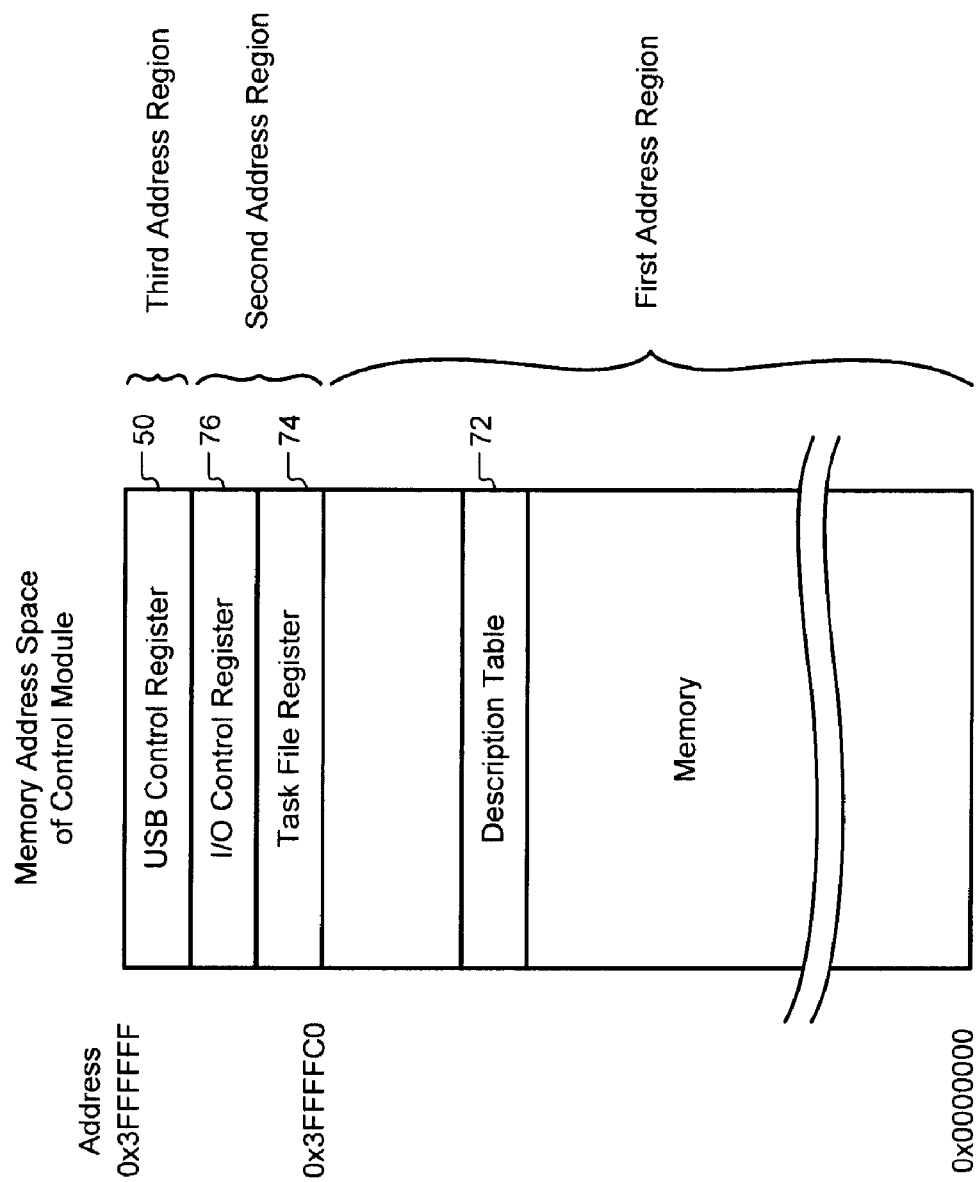
FIG. 4 illustrates an exemplary memory address space of the control module according to the present disclosure.

Referring now to FIG. 4, an exemplary memory address space of the control module 12 includes the first address region, the second address region, and the third address region. The first address region is assigned to memory 20. The first address region may include a region in which a description table 72 is written. The description table 72 includes information designating the reading or writing position of data in memory 20.

The second address region is assigned to the external storage control register 48. The external storage control register 48 may include a task file register 74 and an I/O control register 76. The task file register 74 includes position information for reading and writing data on the HDD 14. The I/O control register 76 includes an I/O control command. The third address region is assigned to the USB control register 50.

Referring now to FIG. 5, exemplary information included in the task file register 74 is shown. The task file register 74 may include a start address of the data, for example, logical block address (LBA) low, LBA mid, and LBA high. The task file register 74 may include a number of sectors of data (e.g., sector count). The task file register 74 may include information designating a device and a head (e.g., device/head). The task file register 74 may include the status of the HDD 14. A command may be written into the task file register 74. The task file register 74 may also include control information, error information, and other information for reading and writing data.

Referring now to FIG. 6, exemplary information included in the I/O control register 76 is shown. The I/O control register 76 includes a command register, a status register, a pointer register, and a control register. The command register includes instructions for the HDD 14 (e.g., read/write, start/stop). The status register includes error information and a current descriptor. The pointer register includes a description pointer address designating a start position of the description table 72. The control register includes a clock frequency and a data transfer mode of the external storage interface 200.

Referring now to FIG. 7, exemplary information included in the description table 72 is shown. The description table 72 designates positions of data. For example, the description table 72 includes a start address (e.g., description address), information designating an end of transmission (EOT), and a transfer byte for first to n-th pieces of data, where n is an integer greater than one. The EOT indicates that transmission of the corresponding data ends.

Referring now to FIG. 8, exemplary information included in the USB control register 50 is shown. The USB control register 50 may include information associated with the USB standard. For example, the USB control register 50 may include a plurality of registers shown.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A bridge circuit comprising:
a bus;
a memory interface module configured to
receive a memory address from a processor via a memory interface, wherein the processor is external to the bridge circuit, and
output the memory address to the bus, wherein the memory address corresponds to one of a plurality of address regions of an address space of the processor;
a memory control module configured to
receive the memory address via the bus, and
communicate with a main memory of the processor in response to the memory address corresponding to a first one of the plurality of address regions, wherein the main memory is internal to the bridge circuit; and
an external storage control module configured to
receive the memory address via the bus, and
communicate with an external storage device in response to the memory address corresponding to a second one of the plurality of address regions.

2. The bridge circuit of claim 1, further comprising the main memory.

3. The bridge circuit of claim 2, wherein the main memory includes at least one of dynamic random access memory (DRAM), synchronous DRAM (SDRAM), and double data rate DRAM (DDR).

4. The bridge circuit of claim 1, further comprising:
a peripheral device control module configured to
receive the memory address via the bus, and
communicate with a peripheral device in response to the memory address corresponding to a third one of the plurality of address regions.

5. The bridge circuit of claim 1, further comprising an external storage interface configured to interface the external storage control module to the external storage device.

6. The bridge circuit of claim 5, wherein the external storage interface includes at least one of an advanced technology attachment (ATA) interface, a serial ATA (SATA) interface, an advanced technology attachment packet interface (ATAPI), a consumer electronics ATA (CE-ATA) interface, a personal computer memory card international association (PCMCIA) interface, and a small computer systems interface (SCSI).

7. The bridge circuit of claim 4, further comprising a peripheral device interface configured to interface the peripheral device control module to the peripheral device.

8. The bridge circuit of claim 7, wherein the peripheral device interface includes a universal serial bus (USB) interface.

9. The bridge circuit of claim 1, wherein the memory interface includes a dynamic random access memory (DRAM) interface.

10. The bridge circuit of claim 1, wherein the external storage device includes at least one of a magnetic storage device and an optical storage device.

11. The bridge circuit of claim 1, wherein the external storage device communicates with the main memory via the bus.

12. The bridge circuit of claim 4, wherein the peripheral device communicates with the main memory via the bus.

13. The bridge circuit of claim 1, wherein the processor communicates with the main memory and the external storage device via the memory interface.

14. A consumer electronics (CE) device comprising:
the bridge circuit of claim 1; and
a control module that includes the processor,
wherein the control module is configured to communicate with the memory interface module via the memory interface, and
wherein the control module is configured to communicate with the main memory and the external storage device via the memory interface module.

* * * * *